US007240052B2

(12) United States Patent
Sidlosky et al.

(10) Patent No.: US 7,240,052 B2
(45) Date of Patent: Jul. 3, 2007

(54) REFINEMENT OF A SEARCH QUERY BASED ON INFORMATION STORED ON A LOCAL STORAGE MEDIUM

(75) Inventors: Jeffrey Alan Joseph Sidlosky, San Jose, CA (US); Creighton W. Chong, Fremont, CA (US); Thomas J. Obenhuber, deceased, late of San Francisco, CA (US); by Inessa Obenhuber, legal representative, San Francisco, CA (US); Para Kanagasabai Segaram, Brookfield (AU)

(73) Assignee: IAC Search & Media, Inc., Oakland, CA (US)

( * ) Notice: Subject to any disclaimer, the term of this patent is extended or adjusted under 35 U.S.C. 154(b) by 0 days.

(21) Appl. No.: 10/934,872

(22) Filed: Sep. 3, 2004

(65) Prior Publication Data

US 2005/0091205 A1    Apr. 28, 2005

Related U.S. Application Data

(60) Provisional application No. 60/501,360, filed on Sep. 9, 2003.

(51) Int. Cl.
*G06F 17/30* (2006.01)
*G06F 15/16* (2006.01)

(52) U.S. Cl. ............................. 707/3; 707/10; 709/225
(58) Field of Classification Search .................... 707/1, 707/2, 3, 10; 709/225; 717/103; 345/588; 715/516
See application file for complete search history.

(56) References Cited

U.S. PATENT DOCUMENTS

| 6,321,228 | B1 * | 11/2001 | Crandall et al. | 707/10 |
| 2002/0030689 | A1 * | 3/2002 | Eichel et al. | 345/588 |
| 2002/0161747 | A1 * | 10/2002 | Li et al. | 707/3 |

* cited by examiner

*Primary Examiner*—Jeffrey Gaffin
*Assistant Examiner*—Hassan "Tony" Mahmoudi
(74) *Attorney, Agent, or Firm*—Blakely, Sokoloff, Taylor & Zafman; Stephen M. De Klerk

(57) ABSTRACT

The generation a search query based on information stored on a storage medium is described. According to one embodiment of the invention, search criteria is entered to perform a search of a storage medium of a client computer. The search of the storage medium determines a web search criteria. The client computer provides search results based on the web search criteria.

51 Claims, 6 Drawing Sheets

REFINEMENT OF A SEARCH QUERY BASED ON INFORMATION STORED ON A LOCAL STORAGE MEDIUM

CROSS-REFERENCE TO RELATED APPLICATIONS

This application claims the benefit of U.S. Provisional Application No. 60/501,360 filed Sep. 9, 2003 which is incorporated herein by reference.

TECHNICAL FIELD

Embodiments of the invention relate to the field of network computing and more specifically, to the refinement of a search query based on information stored on a local storage medium.

BACKGROUND

A search engine tool is a software program designed to help a user access documents (e.g., web pages) stored on a computer, for example on a network (e.g., local area network, Internet, etc.), by allowing the user to request documents related to search criteria (typically those containing a given keyword, a set of keywords, or a phrase) and retrieving documents that are associated with that criteria.

Web search engines work by storing information about a large number of web documents that are retrieved from the Internet. These documents are retrieved by an automated software program (e.g., typically known as a web crawler or spider) which follows and retrieves every associative link. The contents of each document is then analyzed to determine how it should be indexed (for example, words are extracted from the titles, headings, or special fields called metatags). This data about the web documents is stored in some form of a web server index database for use in later queries.

For example, when a user makes a query, the search engine looks up the web server index and provides a listing (e.g., a search result) of best-matching web documents according to the query, usually with a short summary having at least the document's title, location, and sometimes parts of the text.

The usefulness of a search engine to most people is based on the relevance of search results that it gives back. While there may be millions of web documents that include a particular keyword or phrase, often particular documents are more relevant, popular, or authoritative. Most search engines employ methods of ranking the results to re-order the search results for purposes of providing the "best" search results first. These algorithms (i.e., ranking methods) use various rules applied to keywords to order the results. Examples of such ranking methods include text matching, link analysis, and click popularity. How a search engine decides which documents are the best matches, and what order the results should be shown in, varies widely from one engine to another.

The accuracy in the relevancy is not only relevant to the searcher but also to the provider of search functionality who uses the information for targeted advertisements, inserts or other sources of additional revenue. Therefore, search systems should be designed to better match the expectation of searchers.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

A method and apparatus is described to refine web search queries based on information stored on a local storage medium. A network search criteria which is refined based on information stored on a local storage medium is described. The refinement of the network search criteria may increase the relevancy of the search results to the intended user. The search results may also be used to improve the relevancy of targeted advertising, inserts or other additional information which can displayed as part of the search results to the user as will be described.

Figure 1:
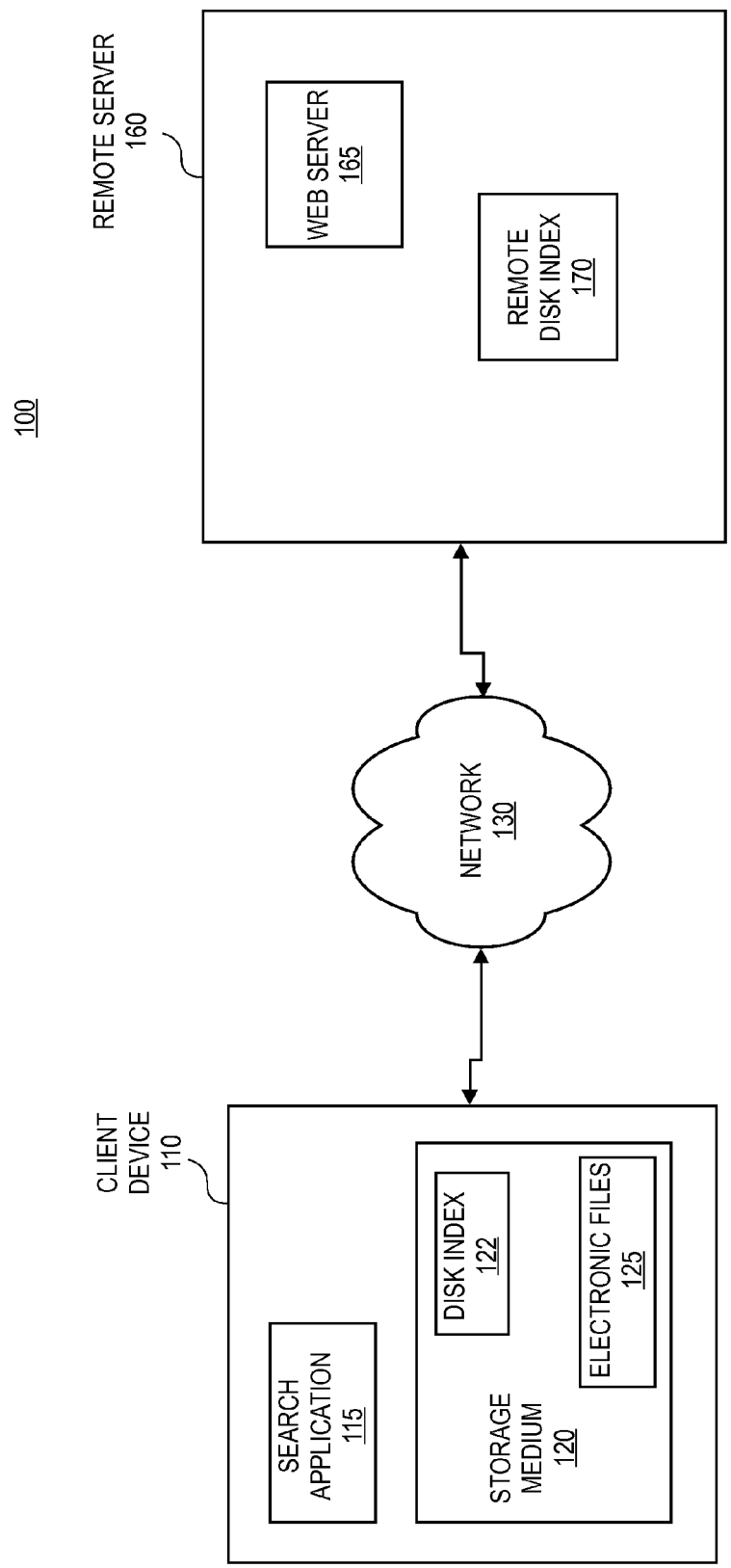
FIG. 1 is a block diagram of a network environment that is suitable for one embodiment of the invention.

FIG. 1 illustrates a network environment 100 that is suitable for one embodiment of the invention. Network environment 100 includes a client device 110 and a remote server 160 electronically coupled via a communications network 130.

The client device 110 includes a search application 115, a plurality of electronic files 125, a disk index 122, and a storage medium 120. The search application 115 enables a user to request and receive information stored on the client device 110 and/or the remote server 160. The search application 115 may be a proprietary software application, a portion of which may be embedded within a web-based browser application, such as Internet Explorer of Microsoft Corporation of Redmond, Wash., Netscape Browser of America Online of Fairfax, Va., etc. The client device 110 may be a personal computer, a tablet computer, a handheld device (e.g., a personal digital assistant, a mobile phone, etc.), a set-top device, or the like.

The electronic files 125 may include music files, word processing documents, spreadsheet documents, application files, video files, digital image files, etc. Each file may include metadata that describes the file. For example, a music file may include metadata that indicates the name of the song on the file, the type of music, the author of the music, the performer of the music, etc.

Figure 2:
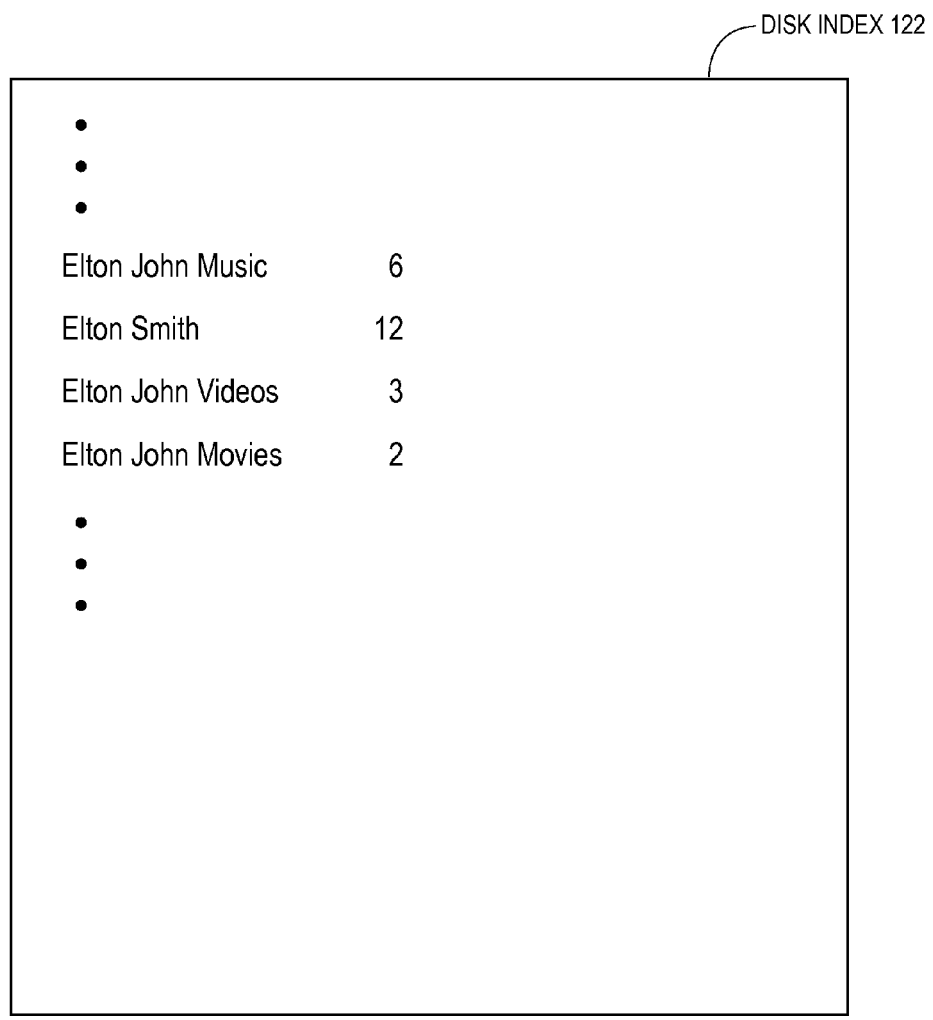
FIG. 2 is a block diagram of a disk index that resides on a storage medium of a client device in the network environment of FIG. 1.

Reference is now made to FIGS. 1 and 2 in combination. The disk index 122 includes a list of all words found in each of the electronic files 125 together with a pointer showing where each of the related files are located on the storage medium 120. The disk index 122 may also store the number of times a word/phrase is used by the electronic files 125 on the storage medium 120. The disk index 122 shows four records to include a word/phrase and the number of times this word/phrase is mentioned on the storage medium 120. The information stored in the disk file 122 is to refine a given search criteria to provide more relevant search results to a user. It is understood that FIG. 2 illustrates a simplified view of the disk index 122 and the disk index 122. Further information such as the number of times the related file has been accessed, the number of times the word/phrase is used in each electronic files 125, the location of the related electronic file, etc. may, for example, also be include in the disk index 122.

When the user initiates a search based on specific search criteria, the search application 115 will access the disk index 122 to find words/phrases that are associated with the search criteria and presents to the user a list of the found words/phrases. The found word/phrase may also be used to manually or automatically refine the search criteria to be transmitted to the remote server 160. The disk index 122 may be generated using indexing tools that are commonly available and may be updated on a periodic basis to ensure the disk index 122 is up-to-date and relevant.

The storage medium 120 stores the electronic files 125 and the disk index 122. The storage medium 120 may comprise volatile and/or non-volatile memory that includes, such as read only memory (ROM), random access memory (RAM), magnetic disk storage media, optical storage media, flash memory devices, and zip drives. It should be understood that the storage medium 120 is not required to be stored within the client device 110. Rather, in alternative embodiments, the storage medium 120 may be associated with and accessible to the user of the client device 110 via a communications network (e.g., via network 130), for example, when electronic files are stored remotely on a shared or private file server (e.g., remote storage medium).

The communications network 130 may include a local area network, a wide area network, and the Internet, among examples of wired or wireless networks.

The remote server 160 includes software that enables the remote server 160 to receive a request for information from the client device 110 and provides the requested information to the client device 110 via the communications network 130. The remote server 160 includes a web server application 165 that manages the collection of the requests for information and the providing of the information to the client device 110.

The remote server 160 includes a remote index 170 that may include a list of the location of searchable documents on various network servers on the Internet. For example, upon performing a search the remote server 160 will transmit to the client device 110 a list of uniform resource locators (URLs) related to the documents that are associated with the search criteria. The remote index 170 may be generated by the remote server 160 or another third party using web crawlers or spiders. The remote index 170 by itself is however, not based specifically on the characteristics of the user of the client device 110 and hence may not always present the user of the client device 110 with a relevant search result.

Figure 3:
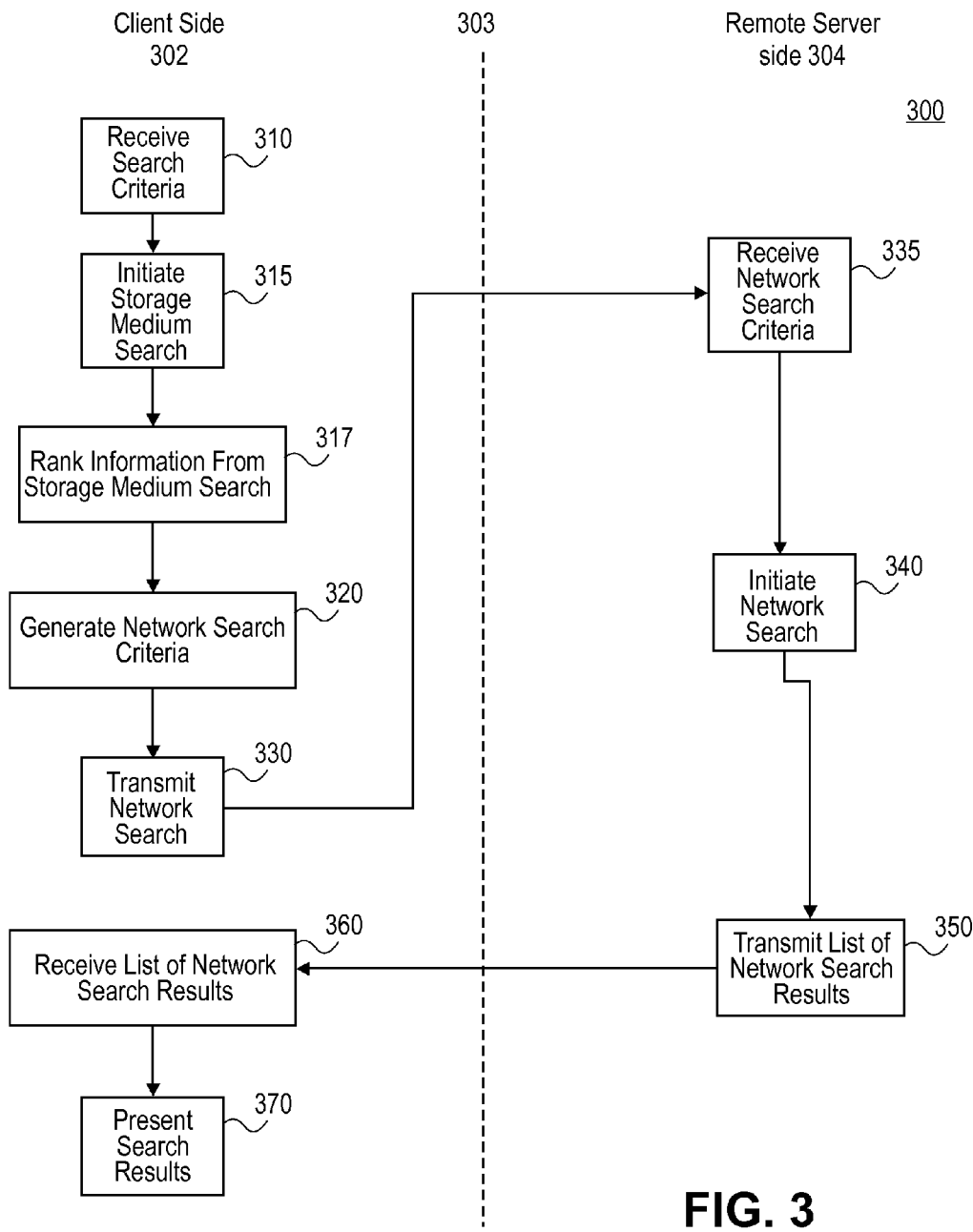
FIG. 3 is a flow chart of a refine search process flow for refining a search criteria based on information stored on the storage medium.

FIG. 3 illustrates a refine search process flow 300 for refining an Internet search criteria based on information stored on the storage medium 120. The refinement of the search criteria for example, will increase the likelihood of presenting the user of the client device 110 with relevant search results. The refine search process flow 300 is separated into a client side 302 and a remote side 304 by line 303.

Figure 4:
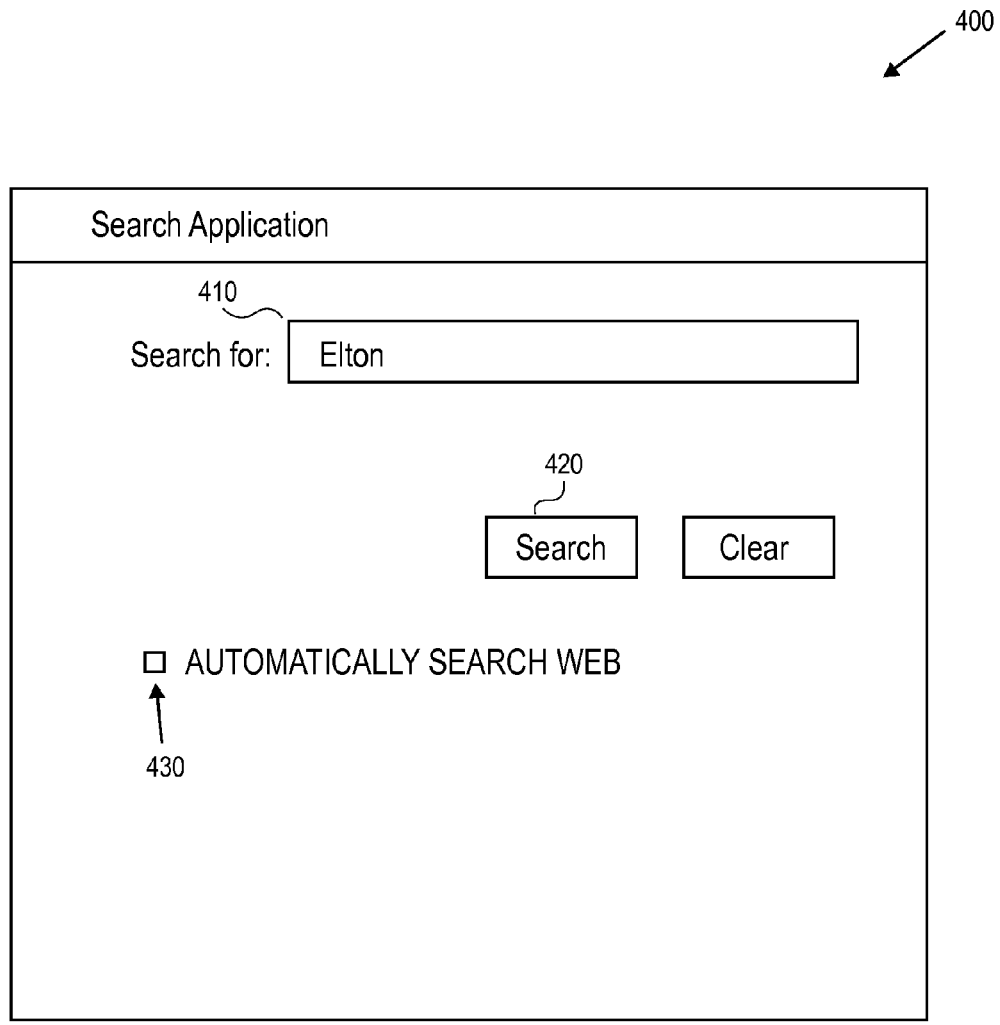
FIG. 4 is a view of a search user interface for the search application.

At block 310, search application 115 receives a search criteria from a user. The search application 115 typically includes a user interface that enables the user to enter search criteria. FIG. 4 illustrates a search user interface 400 generated by the search application 115. The user interface 400 includes a search field 410 and a search button 420. The search field 410 enables a user to provide the search criteria to the search application 115. The search button 420 enables the user to initiate the search.

At block 315, the search application 115 initiates a search of the storage medium 120 based on the search criteria. The search application 115 accesses the disk index 122 to determine which keywords/phrases stored in the storage medium 120 are associated with the search criteria. For example, the search criteria may be 'Elton,' in which case the disk index 122 is used by the search application 115 to associate 'Elton' to specific "Elton John music," to papers written by "Elton Smith" who is a renowned nuclear scientist who has written numerous journal articles, to "Elton John videos," and to "Elton John movies." The storage medium search result may be immediately displayed or temporarily stored in a specific location in volatile or non-volatile memory.

At block 317, the search application 115 ranks the relevancy of the information obtained from the search of the storage medium 120. For example, the search application 115 may determine papers written by Elton Smith are more relevant to the user of the client device 110 due to the number of files stored on the storage medium, the location of the files (e.g., files stored in the 'My Favorite Documents' directory are more relevant to the user of the client device 110 than files stored in other directories, files stored deep in the directory structure are less relevant, files having specific metadata are more relevant, the number of times a specific file has been accessed, how recently a file has been opened, etc.

At block 320, the search application 115 generates a network search criteria based on the ranking of information received from the search of the storage medium 120. For example, the search application 115 may refine the search criteria from the user to include additional details that better enables the network search to return more appropriate search results. For instance, based on the ranking of information related to the scientist "Elton Smith" on the storage medium 120, the search application 115 might automatically refine the initial search criteria of "Elton" with "Elton Smith" or "Elton Smith papers," or a combination of "Elton Smith OR Elton John music."

At block 330, the search application 115 transmits the network search criteria to the remote server 160 via the communications network 130.

At block 335, the remote server 160 receives the network search criteria.

At block 340, the remote server 160 initiates a search for information meeting the network search criteria. For example, the web server 165 may search the remote index 170 given the network search criteria for relevant information.

At block 350, the remote server 160 transmits a list of network search results to the client device 110. For example, the list of network search results might be a list of URLs of documents that relate to Elton Smith journal articles.

It should be appreciated that the remote server 160, given the word 'Elton' might otherwise have transmitted information related to Elton John, the musician, rather than Elton Smith, the scientist, because Elton John might be considered more popular to the general public. Therefore, by automatically refining the search criteria to "Elton Smith" based on information stored on the storage medium allows for the presentation of more relevant information for the user.

The remote server 160 may also transmit, to the client device 115, more relevant advertising, inserts, or other additional information that may be displayed (but not shown in FIG. 5 below) as part of the search results. For example, the remote server 160 may transmit an advertisement announcing a presentation given by Elton Smith, the nuclear scientist, at a local university rather than or in conjunction with an advertisement announcing an Elton John concert.

At block 360, the client server 110 receives the list of network search results.

Figure 5:
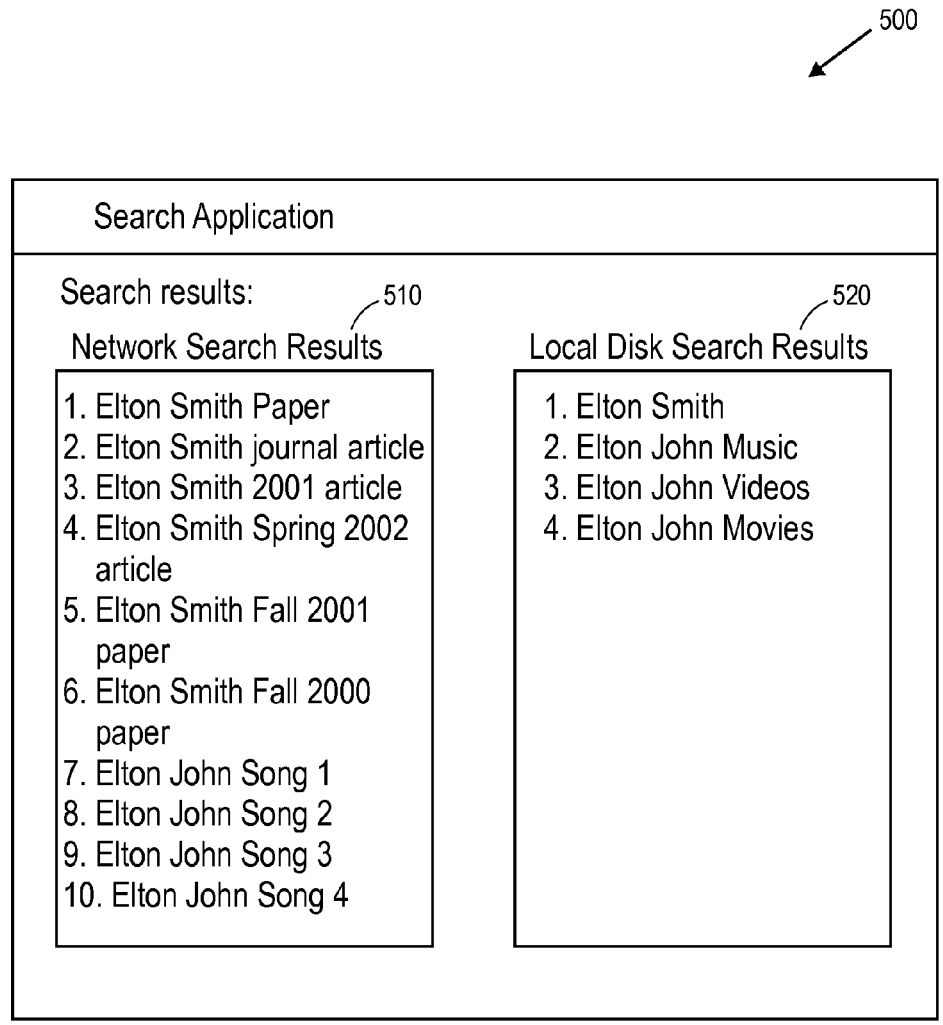
FIG. 5 is a joint search results view displaying the network search results and the storage medium search results.

At block 370, the search application 115 presents to the user both the list of keywords/phrases derived from the storage medium 120 and the network search results. For example, FIG. 5 illustrates a joint search results view 500 including the network search results area 510 and the keywords/phrases search results area 520 to store the network search results and the keyword/phrases respectively. The user can optionally select one of the listed keywords/phrases that will cause the search application 115 to transmit a new search criteria to the remote server 160 based on the selected keyword/phrase. The search results for this new search criteria will be presented in the network search results area 510. The selection of the keyword/phrase may also initiate a new search of the storage medium 120 (e.g., the disk index 122) for relevant information that will be displayed in the keyword/phrase search results area 520 based on the selected keyword/phrase. The search application 115 can thus provide the user with yet further refined personalized suggestions of relevant search criteria based on the information stored on the storage medium 120.

It should be further understood that the invention is not limited to the display of information in this manner. Rather, in alternative embodiments, the search results may be disclosed in one list, the network search results may only be displayed, the keyword/phrase search results may only be displayed, and a network search of the unrefined search criteria may also be presented, etc.

The search application 115 preferably provides the user an option of whether to automatically submit a refined search. For this purpose, the search user interface 400 includes a checkbox 430 that provides the user an option of whether the search application 115 should automatically refine and transmit a decidedly more relevant search based on potentially private data on the client device 110 or simply present the list of found keywords/phrases for the user to select. Checkbox 430 is useful, for example, if the user is weary of the search application 115 performing searches that are not relevant or is based on personal information that could potentially be intercepted as an invasion of privacy.

It should also be appreciated that the invention is not limited to the keyword(s)/phrases to be used to perform a relevant search on the remote server 160. Rather, in alternative embodiments, the manual or automatic use of a keyword/phrase might initiate a search of the storage medium 120. It is also understood that the invention is not limited to refining a search based on information stored on a local storage medium. Rather, in alternative embodiments, information received from performing a network search may be used to refine search criteria to search for information on the storage medium 120. For example, in one embodiment, the search application 115 could use target information derived from search engines on the Internet to be used for searches on the client device 110 and therefore expand the possibility of targeting information onto local searches.

Figure 6:
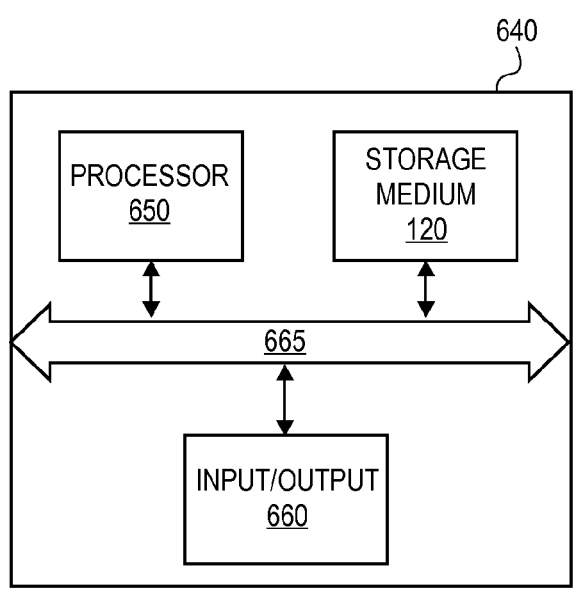
FIG. 6 is a block diagram of an exemplary computer system according to one embodiment of the invention.

FIG. 6 illustrates one embodiment of a computer system suitable for use as the client device 110 and/or remote server 160. The computer system 640 includes a processor 650, a storage medium 120, and an input/output capability 660, all coupled to a system bus 665. Such a configuration encompasses personal computer systems, network computers, television based systems (such as Web TVs or set-top boxes), handheld devices (such as mobile phones and personal digital assistants), and similar devices.

The processor 650 represents a central processing unit of any type of architecture, such as a CISC, RISC, VLIW, or hybrid architecture. In addition, the processor 650 could be implemented on one or more chips. The storage medium 120 is configured to store instructions which, when executed by the processor 650, perform the methods described herein. The storage medium 120 may also store the electronic files 125, the search application 115, and/or the disk index 122.

Input/output 660 may include components to facilitate user interaction with the computer system 640 such as a keyboard, a mouse, a display monitor, a microphone, a speaker, a display, a network card (e.g., Ethernet, Inferred, cable modem, Fax/Modem, etc.), etc. For example, input/output 660 provides for the display of the user interfaces described above, or portions or representations thereof. Input/output 660 also encompasses various types of machine-readable media, including any type of storage device that is accessible by the processor 650.

It will also be appreciated that the operating system software executing the search application 115 stored in storage medium 120 may control the computer system 640. The operating system may be, for example, PC-based, Mac-based, Unix-based, Palm OS, etc. Input/output and related media 660 store the machine-executable instructions for the operating system and methods of the present invention.

In addition, the bus 665 may represent one or more busses (e.g., PCI, ISA, X-Bus, EISA, VESA, etc.) and bridges (also termed as bus controllers). While this embodiment is described in relation to a single processor computer system, the invention could be implemented in a multi-processor computer system.

The description of FIG. 6 is intended to provide an overview of computer hardware and other operating components suitable for implementing the invention, but is not intended to limit the applicable environments. It will be appreciated that the computer system 640 is one example of many possible computer systems that have different architectures. A typical computer system will usually include at least a processor, a memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

It further will be appreciated that the method described in conjunction with FIG. 3 may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods described herein. For the purposes of this specification, the term "machine-readable medium" shall be taken to include any medium that is capable of storing or encoding a sequence of instructions for execution by the machine and that cause the machine to perform any one of the methodologies of the present invention. Thus, a machine-readable medium includes any mechanism that provides (i.e., stores and/or transmits) information in a form readable by a machine (e.g., a computer). For example, a machine-readable medium may include read only memory ("ROM"); random access memory ("RAM"); magnetic disk storage media; optical storage media; flash memory devices; electrical, optical, acoustical, or other forms of propagated signals (e.g., carrier waves, infrared signals, digital signals, etc.); etc. Thus, a machine-readable medium includes any mechanism that provides (i.e., stores and/or transmits) information in a form readable by a machine (e.g., a computer). One of skill in the art will immediately recognize that the term "machine-readable medium/media" further encompasses a carrier wave that encodes a data signal. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result.

Thus, the generation a search query based on information stored on a storage medium has been described. It is understood that the local search and the network search may be performed in real-time or delayed, in sequence or in parallel. For example, in one embodiment, it is understood that in the case of network unavailability, the pre-configured network search criteria may be stored on the client device 110 until the network is available. The search results may include targeted information, targeted links or other targeted communications related to searches on a local computer or vice versa or both.

While the invention has been described in terms of several embodiments, those skilled in the art will recognize that the invention is not limited to the embodiments described. The method and apparatus of the invention can be practiced with modification and alteration within the scope of the appended claims. The description is thus to be regarded as illustrative instead of limiting on the invention.

What is claimed is:

1. A computer-implemented method of performing a search comprising:
   using a client computer to enter a search criteria, the client computer including a storage medium;
   performing an operation to initiate a search;
   performing a search of the storage medium automatically in response to the operation and the search criteria to refine the search criteria and determine a web search criteria;
   requesting search results from a remote server based on the web search criteria; and
   providing the search results on the client computer based on the refined search criteria.

2. The computer-implemented method of claim 1, wherein the search of the storage medium includes accessing a disk index for information related to the search criteria.

3. The computer-implement method of claim 2, wherein the information related to the search criteria includes at least one of a keyword and a phrase.

4. The computer-implemented method of claim 3, further comprising:
   displaying the at least one of the keyword or the phrase.

5. The computer-implemented method of claim 1, wherein the search results is a web-based search result including one or more links to uniform resource locators.

6. A computer-implemented method of performing a search, comprising:
   using a client computer to enter a search criteria;
   performing an operation to initiate a search;
   performing (i) a web search and (ii) a storage medium search on the client computer automatically in response to the operation and based on the search criteria; and
   refining the web search based on the storage medium search to produce refined search results;
   displaying the refined search results on a screen of the client computer.

7. The computer-implemented method of claim 6, wherein the storage medium search includes accessing a disk index for information related to the search criteria.

8. The computer-implement method of claim 7, wherein the information related to the search criteria includes at least one of a keyword and a phrase.

9. The computer-implemented method of claim 8, wherein displaying the results of the storage medium search includes displaying at least one of the keyword or the phrase.

10. The computer-implemented method of claim 6, wherein the displaying the results of the web-search includes displaying one or more links to uniform resource locators.

11. The computer-implemented method of claim 6, wherein the results of the storage medium search is used as criteria for the web search.

12. A device comprising:
   a storage medium; and
   a search application to receive a first search criteria, to perform a first search of the storage medium automatically based on the first search criteria to determine a second search criteria, to transmit the second search criteria to a remote server to perform a second search, to receive a first search result based on a combination of the first search and the second search, to rank the first search result based on the combination of the first search and the second search and to present the ranked first search result from the remote server.

13. The device of claim 12 further comprising the search application to present a second search result of information related to the first search of the storage medium.

14. The device of claim 13, wherein the second result of information includes at least one of a keyword or a phrase.

15. A machine-readable storage medium having instructions to cause a machine to perform a method of performing a search, the method comprising:
   using a client computer to enter a search criteria;
   performing an operation to initiate a search;
   performing (i) a web search and (ii) a storage medium search on the client computer automatically in response to the operation and based on the search criteria;
   refining the web search based on the storage medium search; and
   displaying the refined search results on a screen of the client computer.

16. The machine-readable storage medium of claim 15, wherein the storage medium search includes accessing a disk index for information related to the search criteria.

17. The machine-readable storage medium of claim 16, wherein the information related to the search criteria includes at least one of a keyword and a phrase.

18. The machine-readable storage medium of claim 17, wherein displaying the results of the storage medium search includes displaying at least one of the keyword or the phrase.

19. The machine-readable storage medium of claim 15, wherein the displaying the results of the web-search includes displaying one or more links to uniform resource locators.

20. The machine-readable storage medium of claim 15, wherein the results of the storage medium search is used as criteria for the web search.

21. A machine-readable storage medium having instructions to cause a machine to perform a method of performing a search, the method comprising:
 using a client computer to enter a search criteria, the client computer including a storage medium;
 performing an operation to initiate a search;
 performing a search of the storage medium automatically in response to the operation and the search criteria to refine the search criteria and determine a web search criteria;
 requesting search results from a remote server based on the web search criteria; and
 providing search results on the client computer based on the combined search of the client computer storage medium and the remote server.

22. The machine-readable storage medium of claim 21, wherein the search of the storage medium includes accessing a disk index for information related to the search criteria.

23. The machine-readable storage medium of claim 21, wherein the information related to the search criteria includes at least one of a keyword and a phrase.

24. The machine-readable storage medium of claim 23, further comprising:
 displaying the at least one of the keyword or the phrase.

25. The machine-readable storage medium of claim 21, wherein the search results is a web-based search result including one or more links to uniform resource locators.

26. A computer-implemented method of performing a search comprising:
 receiving a first search criteria at a client device, the client device including a storage medium;
 performing a first search of the storage medium automatically to determine a second search criteria, the first search using the first search criteria;
 transmitting the second search criteria to a remote server to perform a second search;
 receiving a first search result, the first search result being a combination of the first search and the second search;
 ranking the first search result based on the combination of the first search and the second search; and
 presenting the ranked first search result from the remote server at the client device.

27. The computer-implemented method of claim 26, further comprising:
 presenting a second search result of information related to the first search of the storage medium.

28. The computer-implemented method of claim 26, wherein the second search result of information includes at least one of a keyword and a phrase.

29. The computer-implemented method of claim 26, wherein performing the first search further includes searching a disk index for information related to the first search criteria.

30. The computer-implemented method of claim 26, wherein performing the first search further includes searching one or more files on the storage medium for information related to the first search.

31. The computer-implemented method of claim 26, wherein the determination of the second search criteria is based on a ranking of information related to the first search criteria.

32. The computer-implemented method of claim 26, wherein the determination is based on a selection of a phrase resulting from a search for information on the storage medium.

33. The computer-implemented method of claim 26, wherein the second search criteria is based on a refinement to the first search criteria.

34. The computer-implement method of claim 26, wherein the first search result is a network search result.

35. The computer-implemented method of claim 26, wherein the second search result is a storage medium search result.

36. The computer-implemented method of claim 26, wherein the remote server includes a web-based search engine.

37. The computer-implemented method of claim 26, wherein the first search result is a web-based search result including one or more links to uniform resource locators.

38. The computer-implemented method of claim 26, further comprising presenting advertising related to the second search criteria.

39. A machine-readable storage medium having instructions to cause a machine to perform computer-implemented method of performing a search, the method comprising:
 receiving a first search criteria at a client device, the client device including a storage medium;
 performing a first search of the storage medium automatically to determine a second search criteria, the first search using the first search criteria;
 transmitting the second search criteria to a remote server to perform a second search;
 receiving a first search result, the first search result being a combination of the first search and the second search;
 ranking the first search result based on the combination of the first search and the second search; and
 presenting the ranked first search result from the remote server at the client device.

40. The machine-readable storage medium of claim 39, further comprising:
 presenting a second search result of information related to the first search of the storage medium.

41. The machine-readable storage medium of claim 40, wherein the second search result of information includes at least one of a keyword and a phrase.

42. The machine-readable storage medium of claim 39, wherein performing the first search further includes searching a disk index for information related to the first search criteria.

43. The machine-readable storage medium of claim 39, wherein performing the first search further includes searching one or more files on the storage medium for information related to the first search.

44. The machine-readable storage medium of claim 39, wherein the determination of the second search criteria is based on a ranking of information related to the first search criteria.

45. The machine-readable storage medium of claim 39, wherein the determination is based on a selection of a phrase resulting from a search for information on the storage medium.

46. The machine-readable storage medium of claim 39, wherein the second search criteria is based on a refinement to the first search criteria.

47. The machine-readable storage medium of claim 39, wherein the first search result is a network search result.

48. The machine-readable storage medium of claim 39, wherein the second search result is a storage medium search result.

49. The machine-readable storage medium of claim 39, wherein the remote server includes a web-based search engine.

50. The machine-readable storage medium of claim 39, wherein the first search result is a web-based search result including one or more links to uniform resource locators.

51. The machine-readable storage medium of claim 39, further comprising presenting advertising related to the second search criteria.

* * * * *